Figure 1:
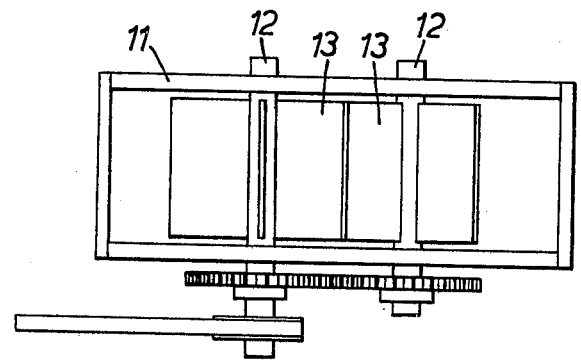

United States Patent [19]

Michael et al.

[11] 4,086,083

[45] Apr. 25, 1978

[54] RECOVERING MATERIAL

[75] Inventors: Anthony Dennis Michael, London; John Albert White, South Harrow; Gerald Louis Griffin, Northolt, all of England

[73] Assignee: The Glacier Metal Company Limited, England

[21] Appl. No.: 759,567

[22] Filed: Jan. 14, 1977

[51] Int. Cl.² .......................................... C22B 25/06
[52] U.S. Cl. ..................................... 75/64; 75/44 S; 75/63; 241/23; 209/214
[58] Field of Search ................. 75/64, 68 R, 63, 44 S; 241/23, 24; 209/214

[56] References Cited

U.S. PATENT DOCUMENTS

| 950,115 | 2/1910 | Reed | 75/64 |
| 971,405 | 9/1910 | Reed | 241/63 |
| 3,481,020 | 12/1969 | Winter et al. | 75/63 |

Primary Examiner—M. J. Andrews
Attorney, Agent, or Firm—Oblon, Fisher, Spivak, McClelland & Maier

[57] ABSTRACT

This invention is a method of recovering an expensive bearing lining alloy from a multilayer bearing material comprising the alloy bonded to a steel backing, possibly through a pure aluminium foil. The multi-layer scrap material is heated sufficiently for severance of the bond between the components to be started, and then is given repeated mechanical shocks which complete the severance of the components which can then be separated from one another by a magnetic method, or possibly by a gravitational method.

5 Claims, 2 Drawing Figures

U.S. Patent  April 25, 1978  4,086,083

RECOVERING MATERIAL

This invention relates to methods of recovering material from scrap-multi-layer material.

One application is the recovery of the lining material from multi-layer bearing material consisting of a strong backing of steel, which is relatively inexpensive and a bearing lining of some more expensive material, for example a tin/aluminium alloy or a material having platinum as a component. Such multi-layer materials are frequently formed by bonding the layers together rather than by sintering or alloying, but even so it is only economical to recover the lining if it can be separated from the backing reasonably easily and with something approaching recovery of 100% of the material seperated.

According to the invention in a method of recovering at least one component from scrap material having different metals in different layers, the multi-layer material is heated sufficiently to be at a temperature at which severance of the bond between the components is started, and then is supplied to fill partially a container having means for automatically giving repeated shocks to the material, and then the parted pieces are led from the chamber, and the parted pieces of one metal are separated from the parted pieces of another metal. This is done by a magnetic method if one only of the components is steel, or possibly by a gravitational method if neither, or each is ferro-magnetic.

It has been discovered that the method described enables the components to be separated easily enough for it to be economical to set up plant for the recovery process. It can be designed to operate automatically-including recycling of the recovered component to material manufacturing plant without requiring continuous oversight.

The invention has particular application to material in which the bearing layer is alloy of tin and aluminium. It is believed that in such a case, one way in which the severance of the bond between the components is started, is for the temperature to be sufficient for the tin to melt, and then if the repeated shocks are applied while the tin is still molten separation of the layers follows quite easily. It is possible for this action to be achieved with alloys with about 6% tin but the effect is much more pronounce if there is more tin for example, 20% tin in the aluminium.

Even if the alloy layer is bonded to the steel backing through an aluminium foil, as is sometimes the case with bearing materials, the separation can apparently be achieved in that way.

The exact means by which separation is started, is not fully understood, and it may be that at the elevated temperature there is a different degree of expansion of the two components of the multi-layer material which helps to start severance of the bond. It is also possible that a brittle layer of aluminium/iron is formed at the bond and that brittle layer can be broken in the method described.

Figure 2:
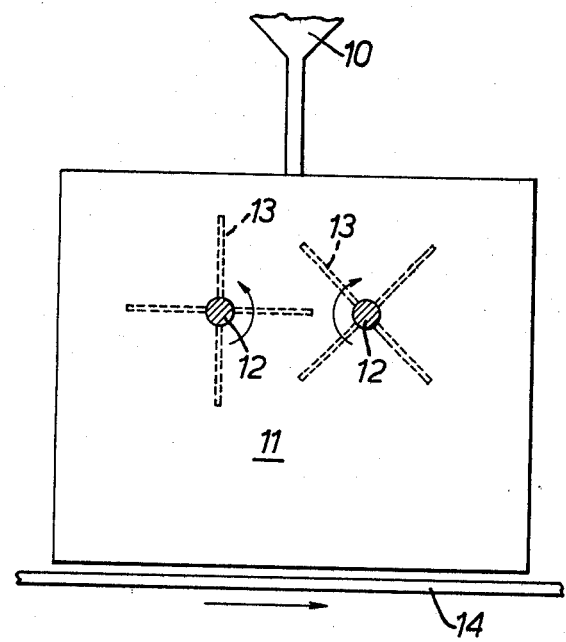

The invention may be carried into practice in various ways and one embodiment will now be described by way of example with reference to the accompanying drawings in which:

FIGS. 1 and 2 are respectively a diagrammatic plan and elevation of separating equipment according to the invention.

The method will be described as applied to the recovery of the bearing lining material from scrap strip material consisting of a steel backing layer having roll bonded to it an 20. tin/aluminium alloy lining through a foil of pure aluminium. Bearing blanks will have been punched from the strip leaving a perforated mesh and loose pieces which may represent quite a high proportion of the original sheet area.

The scrap material is heated for one hour in a large container to a temperature of a little above 200°C. the actual temperature will depend on the components being separated and will probably be predetermined by trial and error, but will usually be above the melting point of tin (or one of the components) but lower than the melting point of all the other component materials.

As the material becomes heated throughout, the tin begins to melt and passes out of the aluminium alloy to form a tin molten layer on the steel which can easily release the bond when the bi-metal is given mechanical shocks. The tin can apparently break through weak boundaries in the aluminium foil to the steel, and accordingly the time taken will depend upon the thickness of the foil. However it is preferred that the material is not heated long enough for aluminium/iron to form at the layer between the foil and the steel.

While the material is still above the melting point of tin the material is fed in batches to a container 11 so as to fill it only partially. The container 11 contains a pair of paddles 12 which are driven in counter-rotation about spaced parallel axes and have blades 13 which continually strike the pieces of heated multi-layer material and also cause them to strike each other. That action parts the layers in almost all the pieces in a time of about 30 seconds.

The parted components can then be delivered-possibly by a belt 14 to a magnetic spearator which extracts the steel pieces and leaves the alloy pieces to a re-melted and and automatically re-cycled to the strip producing plant.

A further batch of scrap can be heated in the same or another oven and the container can be automatically resupplied with heated scrap from time to time.

Other methods of agitating the heated material are by vibrating the container so that the pieces strike into each other and by striking the container with hammer blows.

In another apparatus the strap material is fed by a belt through a tunnel in which it is both heated and agitated so that the separated pieces appear continuously at the outlet end.

In either case the separating chamber could include steel balls which strike the material to help effect separation and which can be separated from the non-magnetic lining material with the rest of the backing material and sorted from that by a sieve and fed back to the chamber.

We claim:

1. A method for recovering a tin-containing alloy layer from a multilayered material comprising in adjacent layers a steel layer, an intermediate aluminum foil layer and said tin-containing alloy layer which comprises;

heating said multilayered material to a temperature of at least the melting point of tin but below the melting point of said tin-containing alloy, for a time sufficient to allow the molten tin to penetrate said aluminum foil layer and to come into contact with said steel layer, but for insufficient time for aluminum and steel to alloy between said aluminum foil layer and said steel layer;

and thereafter subjecting said multilayered material in said heated state to repetitive mechanical shocks to effect separation of said steel layer from said aluminum foil layer.

2. The method of claim 1, wherein said separated layers are classified by use of a magnetic field.

3. The method of claim 1, wherein said tin-containing alloy is an alloy of aluminum and tin.

4. The method of claim 1, wherein there is at least 6% by weight in said tin-containing alloy.

5. The method of claim 4, wherein there is 20% by weight of tin in said tin-containing alloy.

* * * * *